Figure 1:
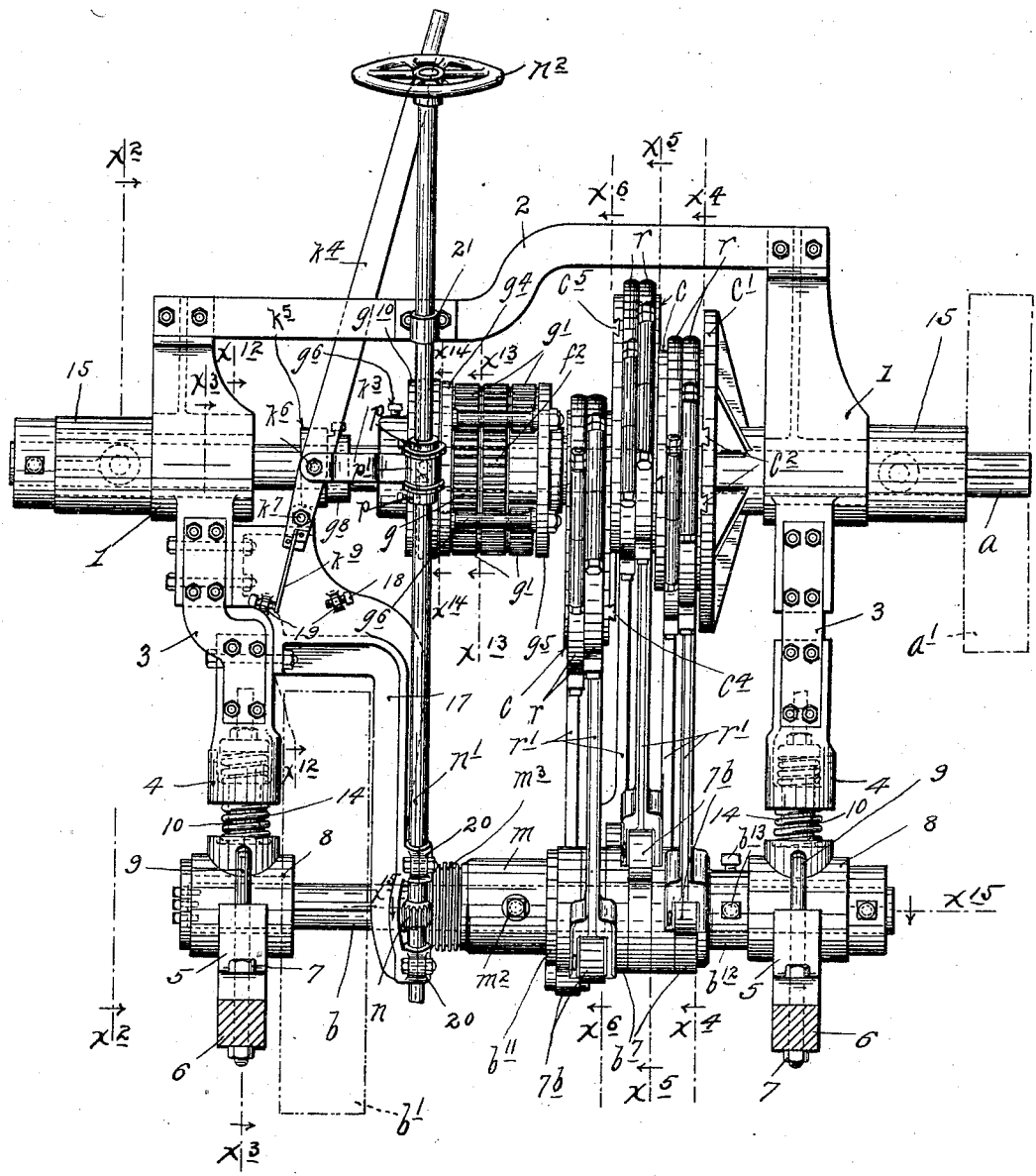

No. 671,676. Patented Apr. 9, 1901.
W. L. JUDSON.
POWER TRANSMITTING DEVICE.
(Application filed Aug. 30, 1900.)
(No Model.) 10 Sheets—Sheet 1.

Witnesses.
Harry Kilgore.
Robert Otto.

Inventor.
Whitcomb L. Judson
By his Attorneys.
Williamson Merchant

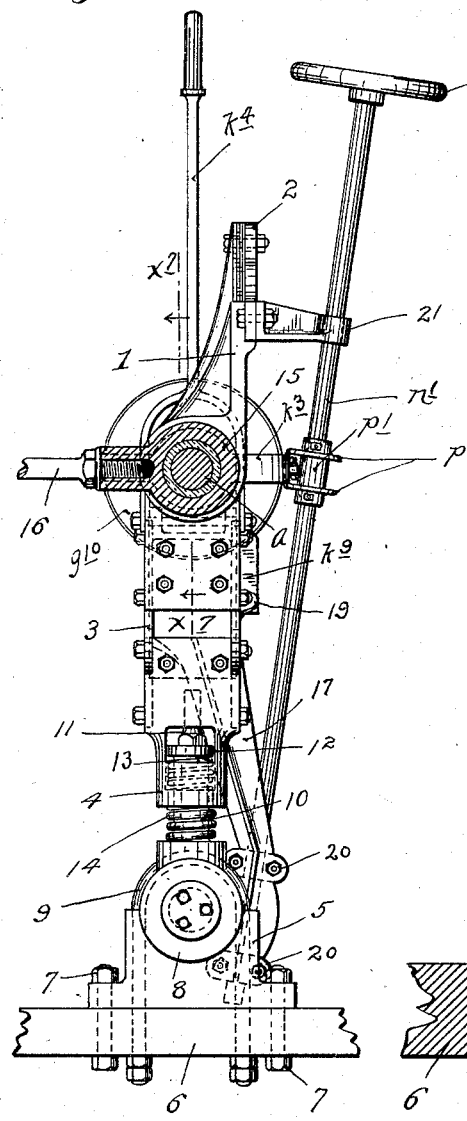

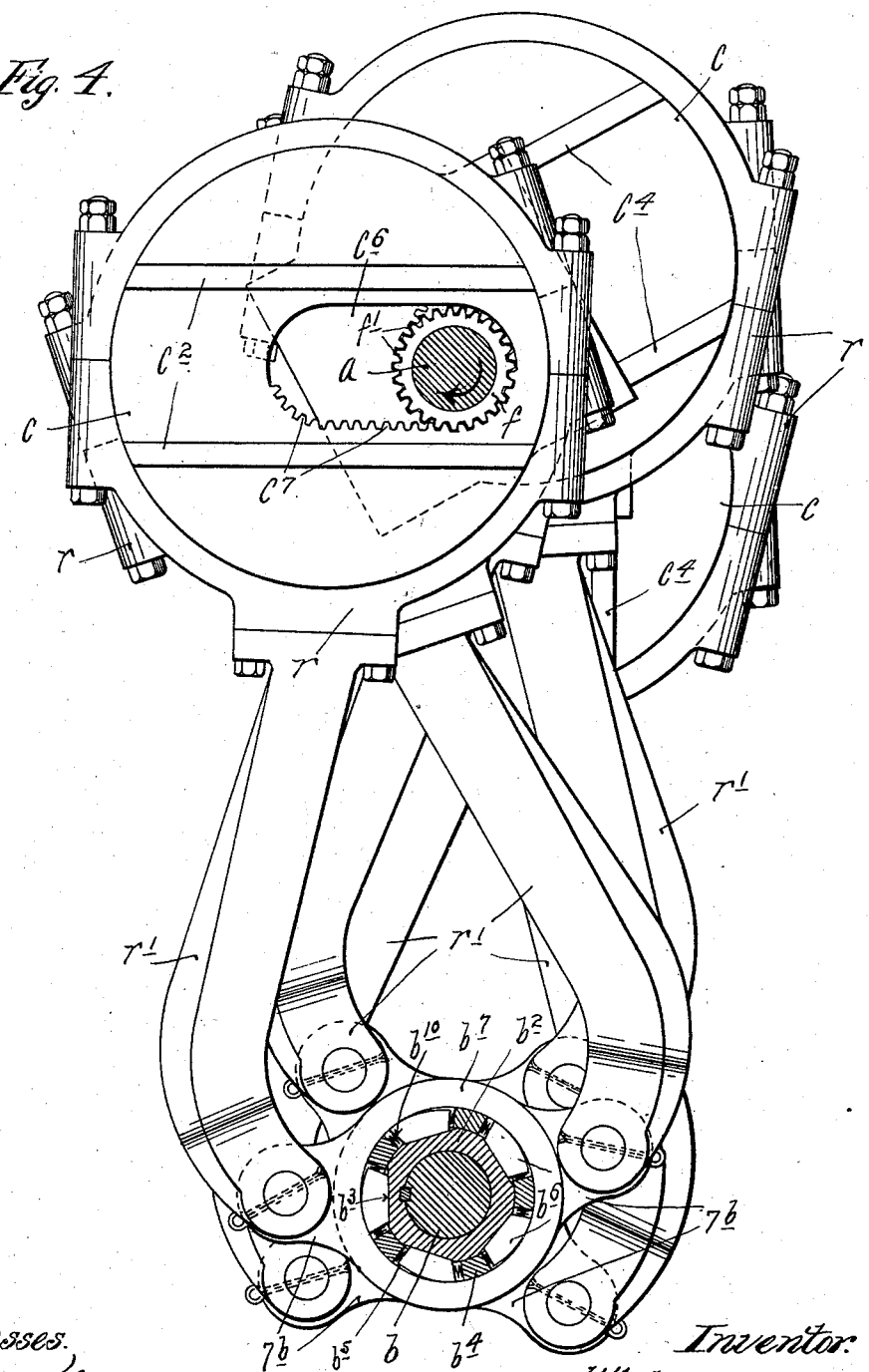

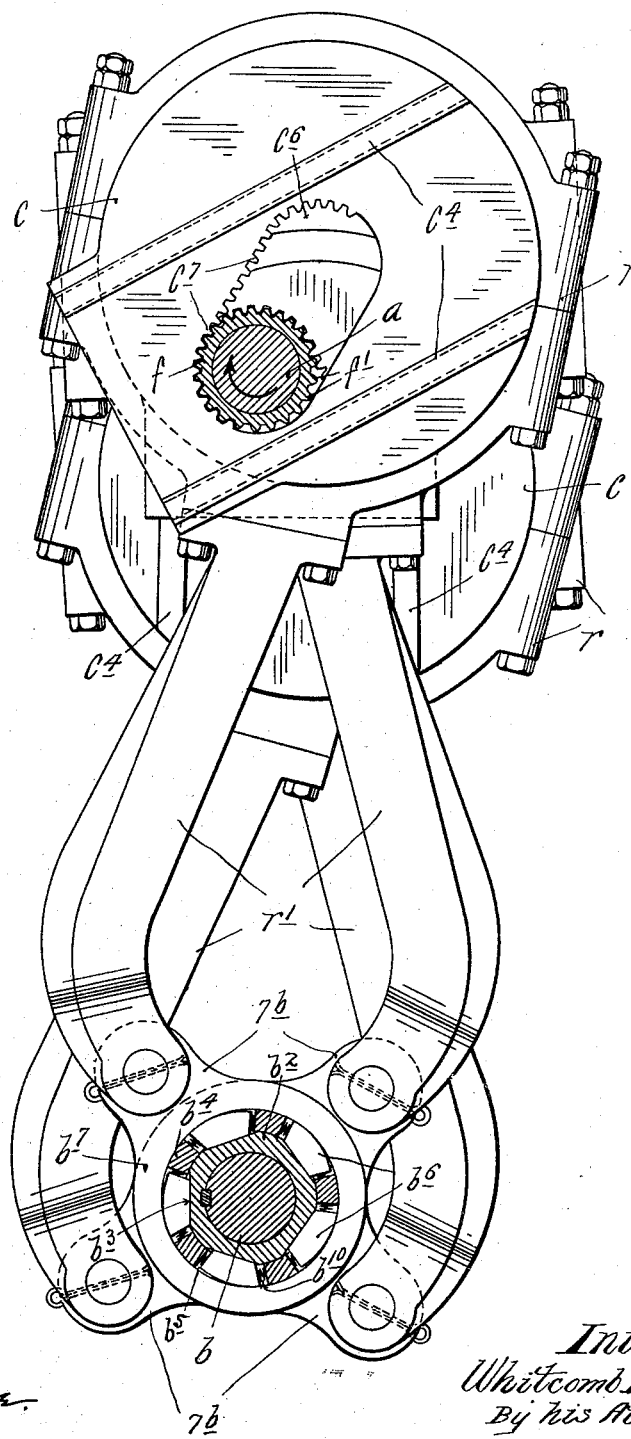

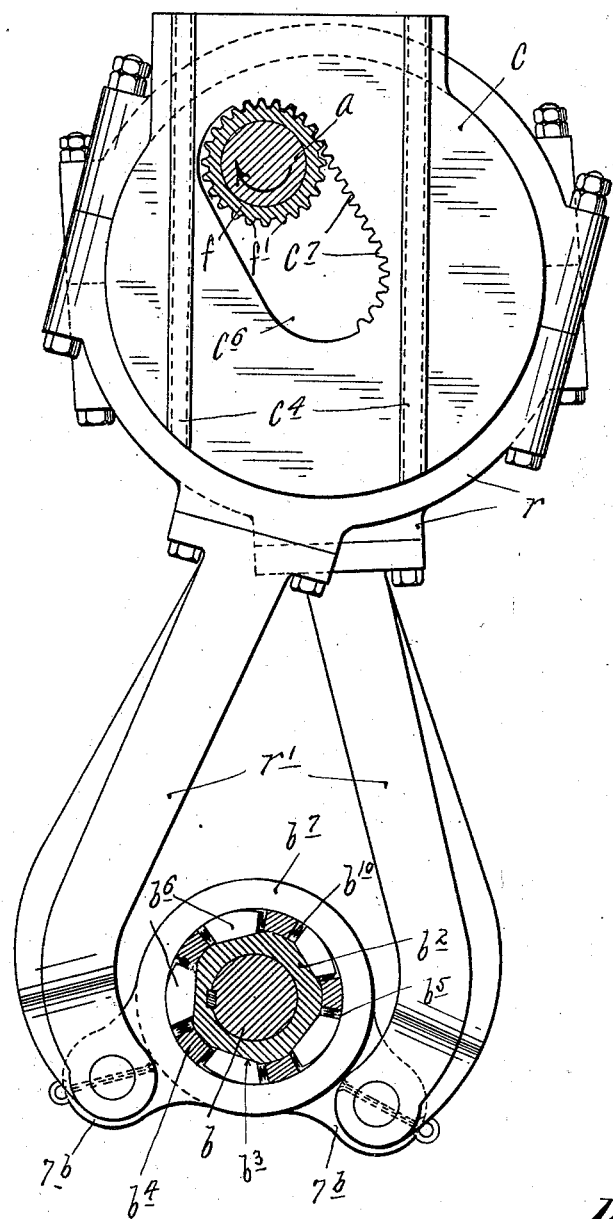

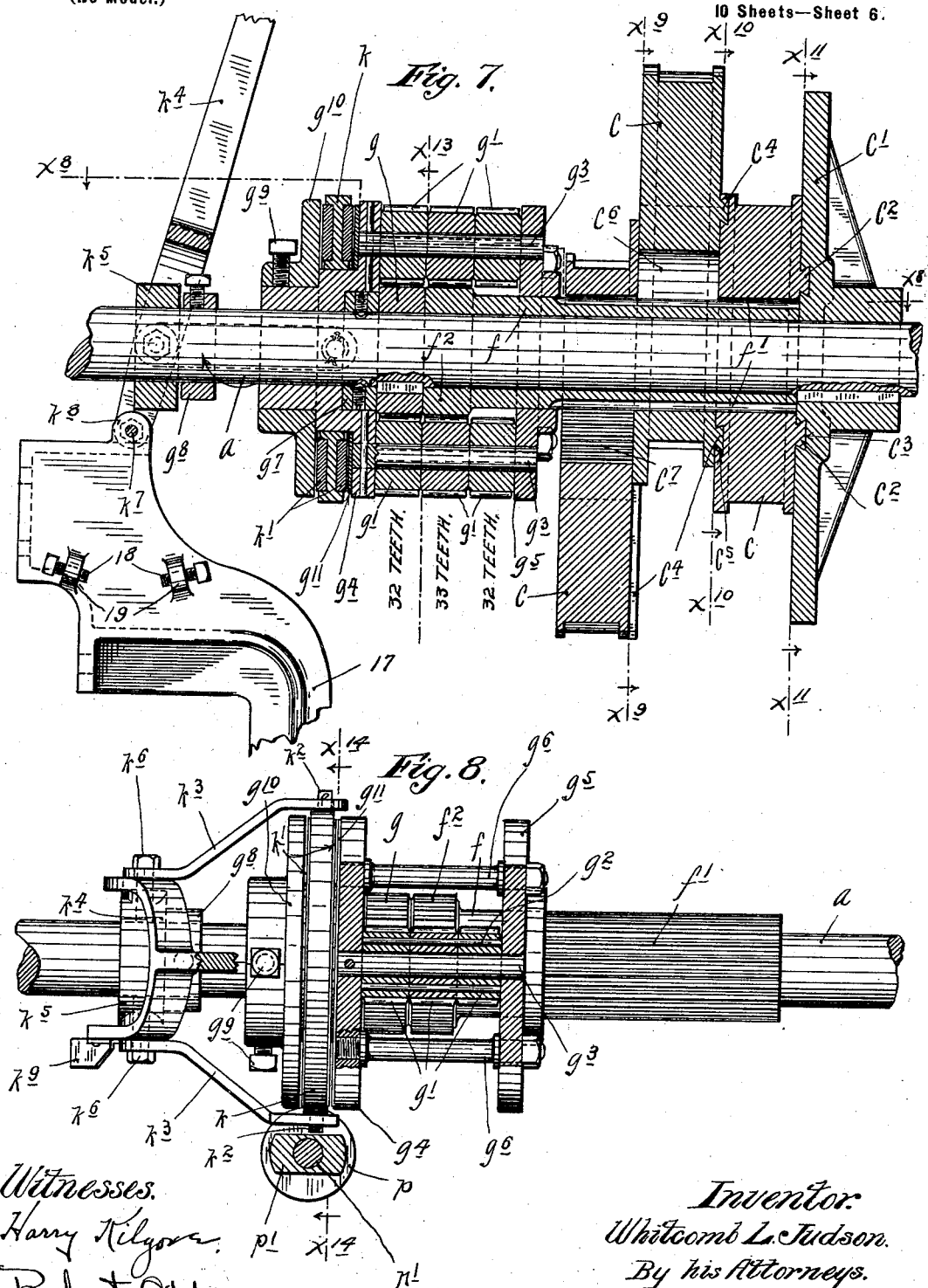

No. 671,676. Patented Apr. 9, 1901.
W. L. JUDSON.
POWER TRANSMITTING DEVICE.
(Application filed Aug. 30, 1900.)
(No Model.) 10 Sheets—Sheet 7.
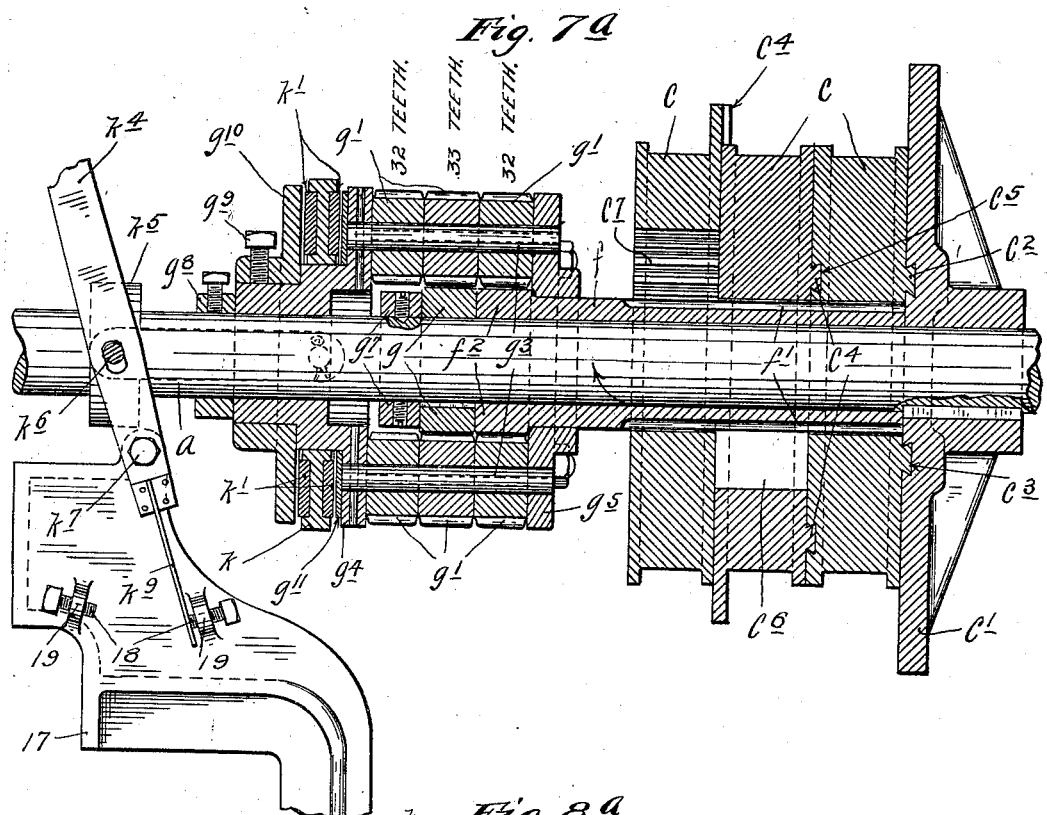
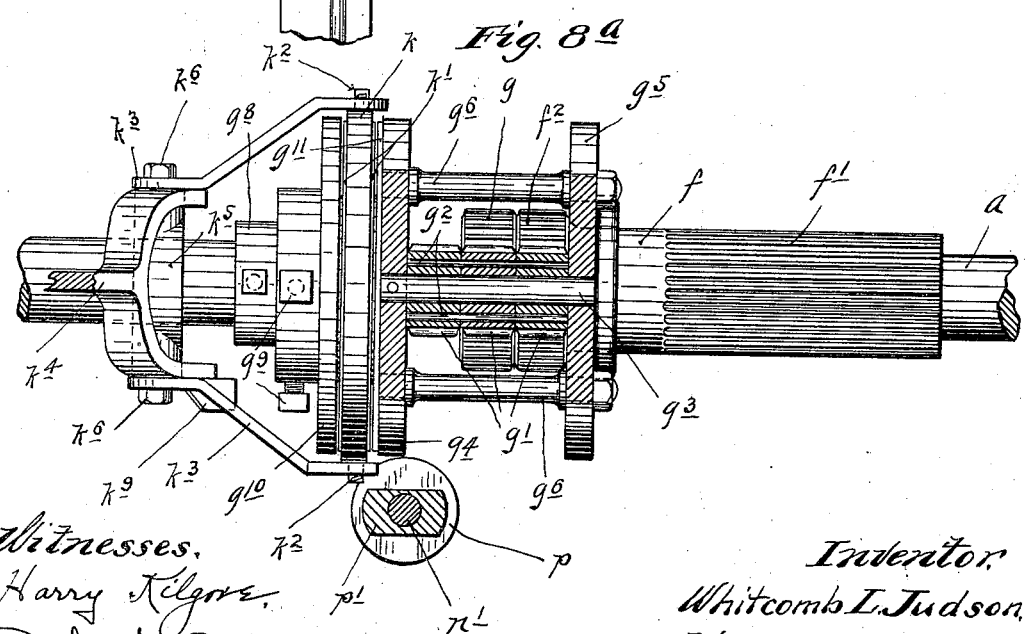
Witnesses.
Harry Kilgore.
Robert Otto.
Inventor.
Whitcomb L. Judson.
By his Attorneys.
Williamson & Merchant No. 671,676.  Patented Apr. 9, 1901.
W. L. JUDSON.
POWER TRANSMITTING DEVICE.
(Application filed Aug. 30, 1900.)
(No Model.)  10 Sheets—Sheet 8.

Witnesses.
Harry Kilgore,
Robert Otto.

Inventor.
Whitcomb L. Judson.
By his Attorneys.
Williamson & Merchant

No. 671,676. Patented Apr. 9, 1901.
W. L. JUDSON.
POWER TRANSMITTING DEVICE.
(Application filed Aug. 30, 1900.)
(No Model.) 10 Sheets—Sheet 9.

Witnesses.
Harry Kilgore
Robert Otts

Inventor
Whitcomb L. Judson.
By his Attorneys
Williamson Merchant

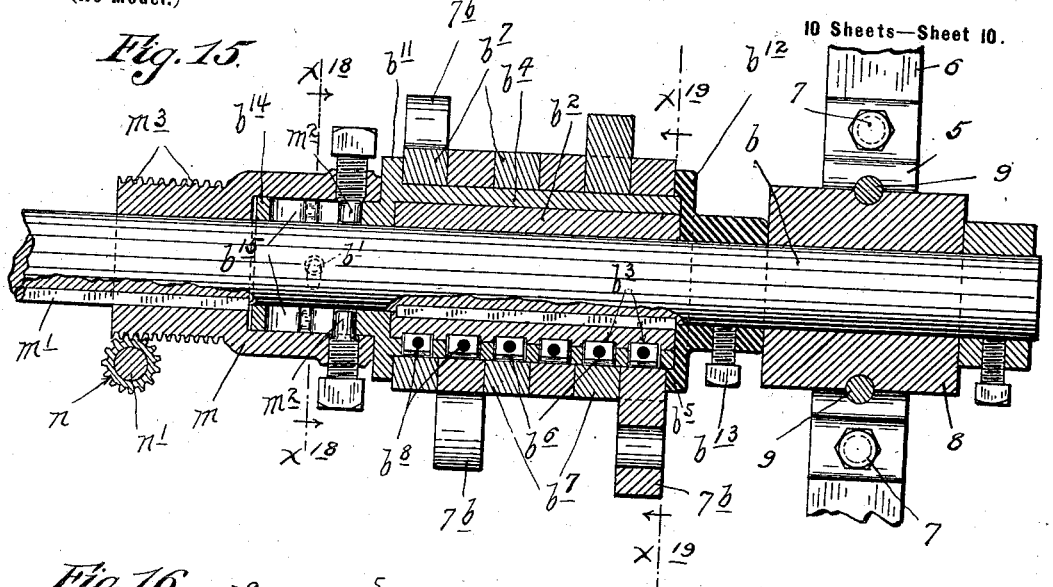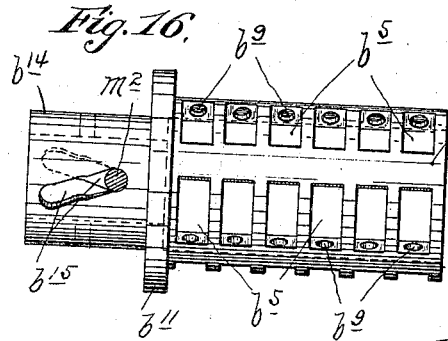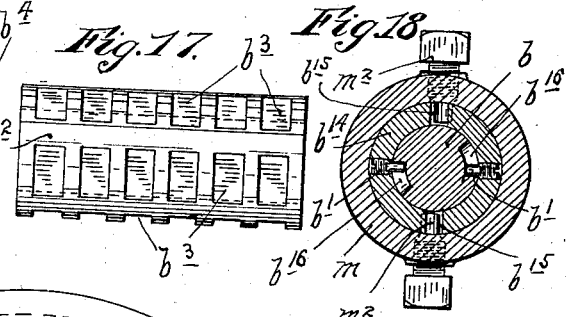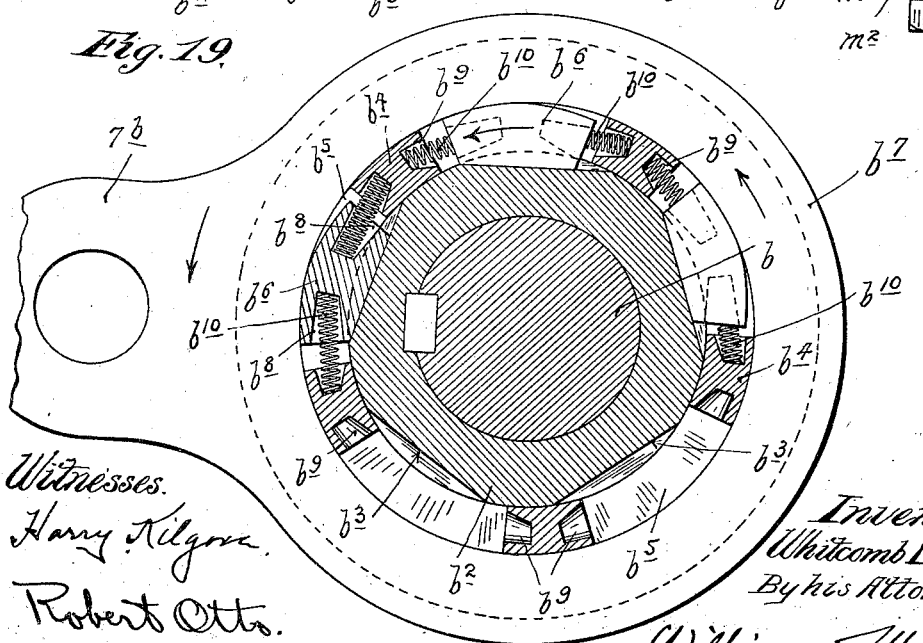

UNITED STATES PATENT OFFICE.

WHITCOMB L. JUDSON, OF CHICAGO, ILLINOIS.

POWER-TRANSMITTING DEVICE.

SPECIFICATION forming part of Letters Patent No. 671,676, dated April 9, 1901.

Application filed August 30, 1900. Serial No. 28,515. (No model.)

*To all whom it may concern:*

Be it known that I, WHITCOMB L. JUDSON, a citizen of the United States, residing at Chicago, in the county of Cook and State of Illinois, have invented certain new and useful Improvements in Power-Transmitting Devices; and I do hereby declare the following to be a full, clear, and exact description of the invention, such as will enable others skilled in the art to which it appertains to make and use the same.

My present invention relates generally to variable-speed power-transmission mechanism, and is especially directed to the improvement of such mechanism, whereby it is adapted to the requirements of automobile and heavy railway transportation service, such as railway-cars, wherein it is desired to transmit a variable speed from a constantly-running motor or power device.

To such ends the invention consists of the novel devices and combinations of devices hereinafter described in defining the claims.

My present improved mechanism is on the same general line as the devices disclosed in my prior United States applications, Serial No. 735,921, filed November 6, 1899, and Serial No. 13,593, filed April 20, 1900. My said prior devices have been found extremely efficient for many purposes, but in common with other prior devices do not fully meet the requirements of heavy transportation service.

It is thought that the importance of several of the salient features of my present invention will be more thoroughly appreciated after a consideration of the following statement.

The power-transmission device illustrated in the drawings and hereinafter described was designed for use on a railway-car employing a one-hundred-horse-power explosive-engine. In my preliminary experiments I found that the heavy eccentrics necessarily employed had a great tendency to go out of balance if only two were employed, as in my prior applications. This objectionable action I obviated by the arrangement of the three eccentrics in the manner hereinafter illustrated and described. I also found that when the device was running at the required speed these heavy eccentrics were thrown outward under the action of centrifugal force with the intense strain of approximately five thousand pounds. It was of course impossible, or at least impracticable, by the direct action and power of a hand-lever to adjust these eccentrics against the action of centrifugal force exerted while the device was under motion from the engine. This difficulty I have overcome in a most satisfactory manner by the provision of a differential gear mechanism, hereinafter described in its preferred form. This differential gear mechanism is arranged to be controlled at will by means of a hand-lever or operating device, and it operates to cause the power of the engine to exert itself to adjust the eccentrics, as hereinafter more particularly described.

My present invention also involves various other novel and important features of construction; but these it is thought will be readily understood without any introductory comments.

The invention is illustrated in the accompanying drawings, wherein like characters indicate like parts throughout the several views.

Figure 9:
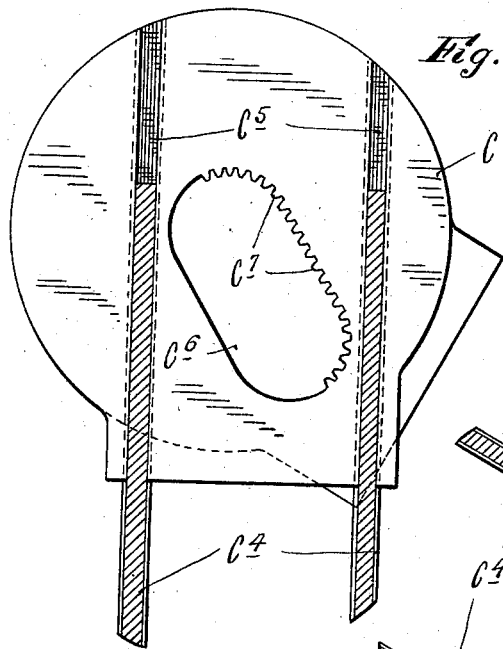
Figure 10:
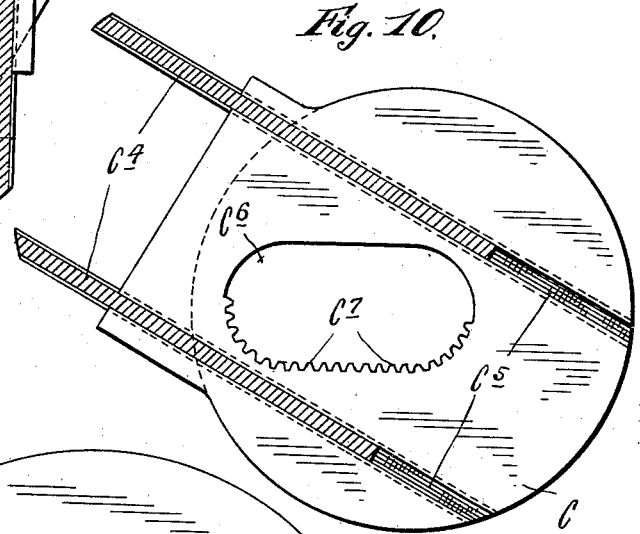
Figure 11:
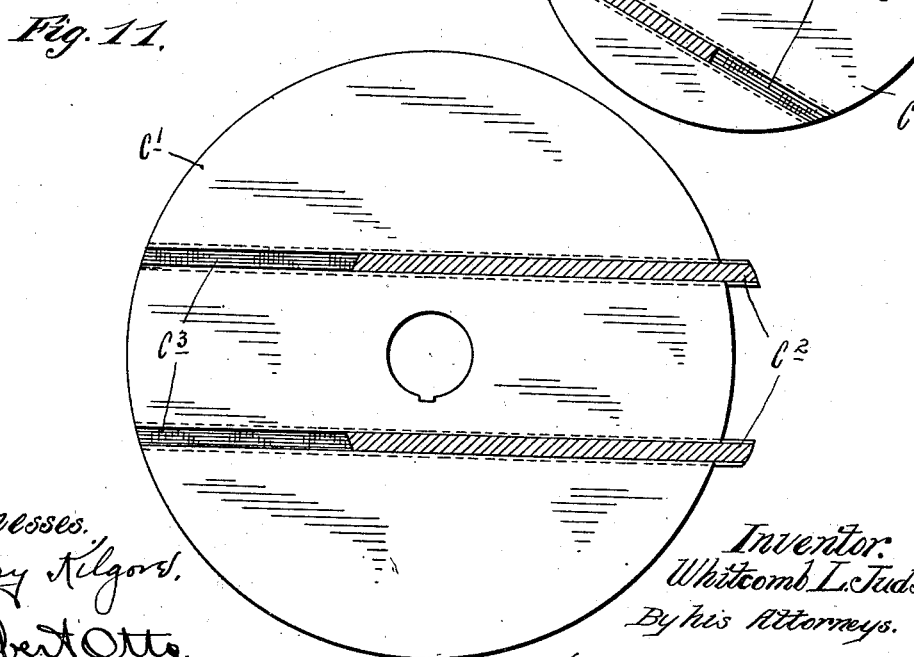
Figure 12:
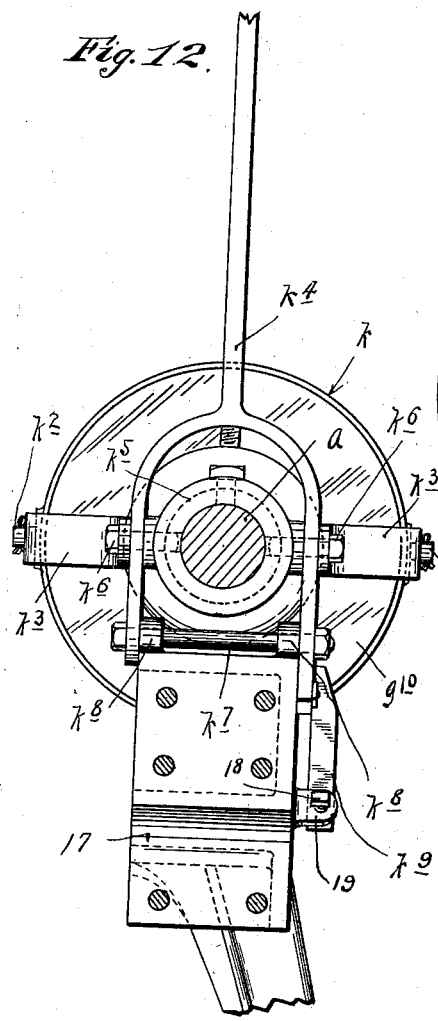
Figure 13:
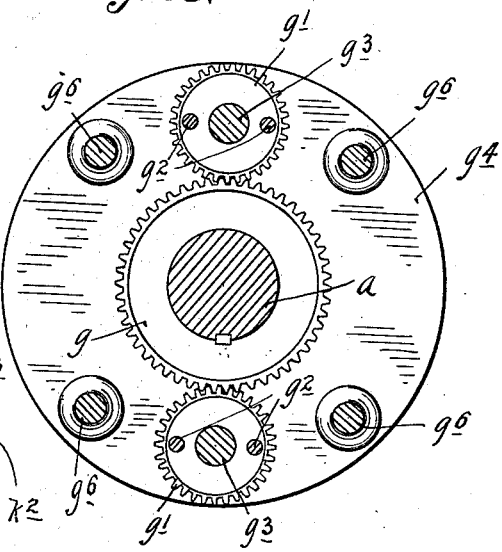
Figure 14:
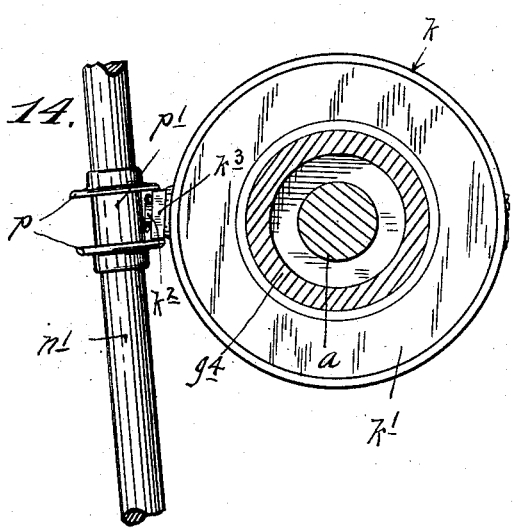

Figure 1 is a front elevation of my improved power-transmitting mechanism. Fig. 2 is a transverse vertical section taken on a line $x^2 x^2$ of Fig. 1. Fig. 3 is an enlarged view, in vertical section, on the irregular line $x^3 x^3$ of Fig. 1. Fig. 4 is a vertical section, on an enlarged scale, taken on a line $x^4 x^4$ of Fig. 1. Fig. 5 is a vertical section corresponding to Fig. 4, but taken on the line $x^5 x^5$ of Fig. 1. Fig. 6 is a vertical section corresponding to Figs. 4 and 5, but taken on a line $x^6 x^6$ of Fig. 1. Fig. 7 is a view on an enlarged scale with some parts broken away, principally in sections on the line $x^7 x^7$ of Fig. 2. Fig. 7$^a$ is a view corresponding to Fig. 7, but illustrating different positions of the parts. Fig. 8 is a horizontal section on the irregular line $x^8 x^8$ of Fig. 7. Fig. 8$^a$ is a view corresponding to Fig. 8, but showing the parts in positions corresponding to Fig. 7$^a$. Fig. 9 is a transverse vertical section on the line $x^9 x^9$ of Fig. 7. Fig. 10 is a transverse vertical section on the line $x^{10} x^{10}$ of Fig. 7. Fig. 11 is a transverse vertical section on the line $x^{11} x^{11}$ of Fig. 7. Fig. 12 is a detail in transverse vertical section, taken on the line $x^{12} x^{13}$ of Fig. 1, some parts being broken away. Fig. 13 is a detail in transverse vertical section on the line $x^{13}$ $x^{13}$ of Fig. 1. Fig. 14 is a detail in transverse vertical section on the line $x^{14}$ $x^{14}$ of Fig. 1, some parts being broken away. Fig. 15 is a detail in horizontal section, taken approximately on the line $x^{15}$ $x^{15}$ of Fig. 1, some parts being broken away. Fig. 16 is a plan view showing the so-called "reversing-sleeve" or "wedge shifting device." Fig. 17 is a plan view showing in detail the driven hub of the reversible clutch removed from the sleeve illustrated in Fig. 16. Fig. 18 is a transverse vertical section taken on the line $x^{18}$ $x^{18}$ of Fig. 15; and Fig. 19 is a detail taken through the reversible driving-clutch on a line $x^{19}$ $x^{19}$ of Fig. 15, some parts being shown in full and others being removed.

The supporting-frame for the mechanism of the present device is preferably constructed as follows, and it involves a novel feature in the nature of a yielding connection or connections between the bearings for the constantly-running driving-shaft and the intermittent or variable speed driven shaft.

Numeral 1 indicates the bearings in which the constantly-running driving-shaft $a$ is mounted. As shown, the bearings 1 are tied together by a cross-bar 2, and they are provided with depending legs 3, of suitable construction, to the lower ends of which recessed bearing-blocks 4 are rigidly secured.

The numeral 5 indicates pedestal-blocks, shown as secured to the floor 6 by means of nutted bolt 7.

The numerals 8 indicate the bearings for the driven shaft $b$. These bearings 8 are shown as held in suitable seats of the pedestal-blocks 5 by means of nutted staples or U-bolts 9, and they are provided with vertically-projected stems 10, which work telescopically through the lower ends of the bearing-blocks 4 and, as shown, are provided with extensions 11, which work through the upper ends of the said blocks 4 and hold in place heavy washers 12, that work within the recesses of the said blocks. On each stem 10 is a pair of coil-springs 13 and 14, the former of which works within the recess of the coöperating block 4 and is compressed between the washer 12 and the lower end of the said block, while the latter is compressed between the upper portion of the bearing 8 and the lower end of the said block 4. These springs 13 and 14 are of such strength that they serve to quite rigidly connect the bearings 1 and 8, but nevertheless yield in both directions and constitute cushions, which prevent a pounding action from the eccentrics.

As shown in the drawings, bearing-heads 15 are loosely mounted on the shaft $a$ just outward of the bearings 1, and these bearing-heads 15 are provided with rod extension 16, the outer ends of which may be secured in any suitable manner, (not illustrated,) so as to permit slight vertical movements of the shaft $a$, as permitted by the yielding action of the frame.

The constant motion from the engine or motor may be assumed to be transmitted to a gear $a'$ on a shaft $a$, and the intermittent or variable speed may be assumed to be transmitted to a gear on one axle of the car from a gear $b'$ on the shaft $b$, which gears $a'$ and $b'$ are indicated by dotted lines in Fig. 1 only.

Three eccentrics $c$, mounted for radial adjustments to and from concentricity with each other and with a constantly-running shaft $a$ on lines radiating at one hundred and twenty degrees apart, are driven by the said shaft $a$. The right-hand eccentric, as viewed in Fig. 7, is mounted to move on a face-plate $c'$, carried by the said shaft $a$. This, as shown, is accomplished by dovetail flanges $c^2$ on the said eccentric $c$, which work in dovetail grooves $c^3$ in the said face-plate. Likewise the other two eccentrics are provided with dovetail ribs $c^4$, that work in dovetail grooves $c^5$, cut in the faces of the right-hand and intermediate eccentrics $c$, as best illustrated in Figs. 7, 9, 10, and 11.

Each eccentric $c$ has an elongated perforation $c^6$, formed on one side with rack-teeth $c^7$. The perforations $c^6$ embrace a long sleeve $f$, which is loosely mounted on the shaft $a$ and is provided with longitudinally-extended gear-teeth $f'$, that mesh with the rack-teeth $c^7$. The sleeve $f$ thus constitutes a very wide-faced pinion, by which the eccentrics $c$ are held in any set position and may be moved from their extended positions (indicated in Figs. 4, 5, 6, and 7) into their concentric positions, (indicated in Fig. 7ª.) By reference particularly to Figs. 9 and 10, but also by reference to Figs. 5 and 6, it will be noted that the racks $c^7$ of the outer or left-hand and of the intermediate eccentrics $c$ extend at an angle of sixty degrees to their dovetail guide-channel $c^5$. This is because these two eccentrics are subjected to a resultant movement of the particular eccentric itself and of the eccentric upon which it is in turn mounted to move. As the inner or right-hand eccentric $c$ is subject only to its own movement, its rack $c^7$ is extended parallel with its guide-ribs $c^2$ and the guide-flanges $c^3$ of the face-plate $c'$, as shown in Figs. 4 and 11.

The loose pinion-sleeve $f$ is provided at its outwardly-extended or left-hand end, as viewed in Figs. 7 and 7ª, with a spur-gear $f^2$, which coöperates as a sun-gear in the system of sun-and-planet gears which make up the so-called "differential gear mechanism."

Keyed or otherwise secured on the constantly-running shaft $a$ by the side of the gear $f^2$ is a spur-gear $g$, having the same pitch-circle and the same number of teeth as the said gear $f^2$ and which as a coöperating member of the sun-and-planet gear system which makes up the differential gear mechanism operates as a sun-gear and as a driving member of the train.

The planet-gears $g'$ are located side by side in a series of three, and preferably these are duplicated at diametrically opposite points. The said gears $g'$ of a given series are rigidly secured for common rotations, as shown, by means of long pins $g^2$, driven therethrough, as shown in Fig. 8, and each series of three is loosely mounted on a spindle or short shaft $g^3$ of a shifting cage made up of heads $g^4$ and $g^5$, the hub portion of the former of which is loosely mounted for both rotary and sliding movements on the shaft $a$, while the latter is likewise loosely mounted on the toothless portion of the loose sleeve $f$. The heads $g^4$ and $g^5$ are properly spaced apart so as to embrace the planet-gears $g'$, but are rigidly connected by strong spacing bolts or studs $g^6$. The movement of the shifting gear-cage $g^4$ $g^5$ toward the right is limited by a stop-collar $g^7$, secured on the shaft $a$, (see Fig. 7,) and the movement of the said cage toward the left is limited by another stop-collar $g^8$ on the said shaft $a$. (See Fig. 7a.)

The intermediate planet-gears $g'$ have each one more tooth than the outer members. For instance, in my constructed device the outside gears $g'$ have thirty-two teeth and the intermediate gear of each series has thirty-three teeth, but the three gears $g'$ have the same pitch-circles. This slight variation between the spacing of the teeth of the gears $g'$ does not prevent the intermediate gear, as well as the outer gears, from running well in mesh with the sun-gears $f^2$ and $g$. The action resulting from this arrangement of the gears will be given in the description of the operation.

Secured, as shown, by means of a set-screw $g^9$ on the hub of the head $g^4$ is a friction-flange $g^{10}$. As shown, the outer face of the rim portion of the head $g^4$ is provided with a metal facing $g^{11}$.

Loosely mounted on the hub of the head $g^4$, between the facing $g^{11}$ and the friction-flange $g^{10}$, is a non-rotary friction brake device in the form of a ring $k$, which is provided with facings $k'$, of rawhide, wood fiber, or other suitable material. At its sides the ring $k$ has trunnions $k^2$, to which the extended ends of links $k^3$ are pivoted. The other ends of the links $k^3$ are pivotally connected to the prongs of a shipper-lever $k^4$ and to a loose collar $k^5$ on the shaft $a$, as shown, by means of set-screws $k^6$. The prongs of the shipper-lever $k^4$ are pivotally fulcrumed, as shown, on a bolt $k^7$, passed through lugs $k^8$ of a supporting-bracket 17, which, as shown, is supported from the left-hand depending leg 3 of the framework, as best shown in Fig. 1.

By means of the shipper-lever $k^4$, acting through the non-rotary brake-ring $k$, the shifting cage $g^4$ $g^5$ may be moved from the one position indicated in Fig. 7 into its other position indicated in Fig 7a. The lever $k^4$ has a spring extension $k^9$, which works between adjustable stops 18 in the form of set-screws mounted in lugs 19 of the supporting-bracket 17. This spring extension $k^9$, acting against the stops 18, serves in either extreme position of the lever to impart sufficient motion thereto to carry the facings $k'$ of the brake-ring $k$ out of frictional contact with the coöperating friction-surfaces of the shifting cage.

The reversible driving-clutch, which acts upon the driven shaft $b$, involves a hub $b^2$, which is keyed or otherwise rigidly secured on the said shaft and is provided with a plurality of wedge engaging surfaces $b^3$, which are cut on chords of the outer cylindrical surface of the hub, and thus form a series of pocket-like recesses. In the construction illustrated there are six series of these recessed surfaces or pockets located side by side, and each series involves five pockets extending circumferentially of the hub. Of course this number and arrangement of these pockets or bearing-surfaces $b^3$ may be varied at will.

Mounted loosely on the hub $b^2$ is a so-called "reversing-sleeve" $b^4$, which has pockets or wedge-seats $b^5$, corresponding in number and arrangement to the pockets or surfaces $b^3$ of the hub $b^2$. In each wedge-seat $b^5$ of the reversing-sleeve $b^4$ is a driving-wedge $b^6$, the inner surface of which is flat and engages the flat bearing-surface $b^3$, which is alined therewith, as best shown in the enlarged views, Figs. 15 and 19. Loosely mounted on the reversing-sleeve $b^4$ is a series of oscillating driving-rings $b^7$, (six in the construction illustrated,) one of which rings surrounds and directly coöperates with each of the six series of wedges $b^6$, as best shown in Fig. 15. As best shown in Fig. 19, the wedges $b^6$ are reversely curved from their centers toward their ends and are of such dimensions that when in an intermediate position they will be loosely held between the flat bearing-surfaces $b^3$ and the inner surfaces of the rings $b^7$; but when moved to an extreme position in either direction they will under the one direction of oscillation of the rings $b^7$ be wedged between the said bearing-surfaces $b^3$ of the hub $b^2$ and the inner surfaces of the said rings $b^7$, as presently more fully illustrated. The uncut and longitudinally-extended portions of the reversing-sleeve $b^4$ and the ends of the wedges $b^6$ are respectively formed with spring-seats $b^8$ and $b^9$, in which coiled springs $b^{10}$ are mounted. The springs $b^{10}$ are thus arranged in pairs to act upon the wedges $b^6$, as best shown in Fig. 19.

The rings $b^7$ are held in operative positions against lateral displacement by a collar or flange $b^{11}$ on the sleeve $b^4$ and by a retaining-head $b^{12}$, which, as shown, is fixed on shaft $b$ by a set-screw $b^{13}$. The wedges $b^6$ of themselves lock the reversing-sleeve $b^4$ against longitudinal or sliding movements on the hub $b^2$, but permit the same the necessary oscillatory movement thereon required to reverse the driving action of the clutch. The reversing-sleeve $b^4$ is permitted the necessary rotary movement on the shaft $b$, but is held against sliding movement, as shown in Fig. 18, by set-screws $b'$ in said sleeve, which work in grooves $b^{16}$ in said shaft $b$.

To oscillate the reversing-sleeve $b^4$ a slidable head $m$ is mounted to rotate with but to slide upon shaft $b$, as shown, by means of a key $m'$. This head $m$ at its right-hand end, as viewed in Fig. 15, telescopes over an extended hub portion $b^{14}$ of the reversing-sleeve $b^4$ and is provided with cam pins or projections $m^2$, as shown, in the form of set-screws, the inner ends of which work in cam-grooves $b^{15}$ of the said hub $b^{14}$.

The movement of the head $m$ from the one extreme position (indicated in Fig. 15) into its other extreme position toward the left causes the cam-pins $m^2$, acting on the cam-grooves $b^{15}$, to impart such rotation to the reversing-sleeve $b^4$ as is necessary to reverse the action of the clutch. The slidable head $m$ is formed with a rack $m^3$, the teeth of which are endless—that is, they run completely around the said head in parallel planes. A small pinion $n$ meshes with the teeth of the rack $m^3$, and this pinion is rigidly secured on a rod $n'$, that is mounted in bearings 20 of the bracket 17 and in a bearing 21 on the frame-bar 2. At its upper end the rod $n'$ is shown as provided with a hand-wheel $n^2$, by means of which it may be turned.

Spaced apart but rigidly secured on the rod $n'$ is a pair of flanged stop-collars $p$, that embrace the free end of one of the links $k^3$, and thus serve to prevent rotation of the non-rotary brake-ring $k$, as best shown in Figs. 1, 8, 8ª, and 14.

Rigid on the rod $m'$, between the collars $p$, is a flattened hub $p'$, which prevents the said rod from being turned when the parts are in the position indicated in Fig. 8, but permits the same to be turned when the parts are in the position indicated in Fig. 8ª. This construction is important and will be further considered in the description of the operation.

Working on each eccentric $c$ are two eccentric-straps $r$, having extended arms $r'$, that are pivotally connected each to an offset or projected lug $7^b$, with which each driving-ring $b^7$ is provided. The eccentric-straps are thus arranged to work in pairs, and the extended arms of each pair are connected to the lugs $7^b$ on opposite sides of the clutch, so that while one is making an operative stroke the other is making its return stroke.

Operation: We will first consider the operation of the mechanism when the eccentrics are projected or thrown into their eccentric positions (indicated in Figs. 1, 4, 5, 6, and 7) and the clutch devices are set in the positions indicated in Figs. 1, 15, 16, and 19, and we will assume that the constantly-running shaft is running in the direction indicated by the arrow marked on Figs. 4 and 7, although, as a matter of fact, with the clutch mechanism set in a given position the shaft $b$ will be driven in a determined direction regardless of the direction in which the shaft $a$ is driven. When the head $m$ is moved to its extreme position toward the right, as viewed in Fig. 15, the reversing-sleeve $b^4$ will be given a relative movement on the hub $b^2$ in the direction indicated by the arrow marked on one of the wedges in Fig. 19 and the alternate springs $b^{10}$ will be compressed, thereby lightly forcing the wedges $b^6$ into the positions indicated in said Fig. 19 and also, but less plainly, in Figs. 4, 5, and 6. When the wedges $b^6$ are thus set and the driving-ring $b^7$ (shown in Fig. 19) is oscillated in the direction indicated by the arrow marked thereon, the wedges $b^6$ will be crowded between the inner surfaces of the said driving-ring and the flat bearing-surfaces $b^3$ of the hub $b^2$, and the shaft $b$ will be rotated in the direction indicated. The reverse movement of the driving-ring $b^7$ will simply loosen up the wedges by driving them backward, so that the said rings freely move without retarding the movement of the shaft $b$ and hub $b^2$. The work of driving the shaft $b$ and hub $b^2$ is taken up in succession by the six driving-rings $b^7$, so that a continuous and even driving action is kept up, the particular ring which at a given instant is moving at the highest rate of speed and in the proper direction being the one which at that time is doing the work. To reverse the action of the driving-clutch, the slidable head $m$ is by means of the hand-wheel $n^2$, rod $n'$, and pinion $n$ moved toward the left as far as permitted by the slots $b^{15}$ of the reversing-sleeve hub $b^{14}$. Under this movement the cam-pins $m^2$, acting on the cam-slots $b^{15}$, rotate the reversing-sleeve $b^4$ backward, and thereby force the driving wedges $b^6$ to the opposite ends of the wedge engaging surfaces $b^3$ of the hub $b^2$. This being done, the hub $b^2$ and shaft $b$ will be driven in a reverse direction from that indicated by the arrows marked on Figs. 7 and 19. When the slidable head $m$ is moved into an intermediate position, so as to bring the cam-pins $m^2$ to the central portions of the cam-slots $b^{15}$, the driving-wedges $b^6$ will be held in intermediate and operative positions.

We will now consider the action of the so-called "differential gear mechanism" which controls the eccentrics. When the eccentrics are set in any position and the gear-shifting cage is left free for rotation, as shown in Fig. 7, for instance, the said cage will rotate with the shaft $a$ and the sun-and-planet gears $f^2$, $g$, and $g'$ will be locked together, so that the pinion-toothed sleeve $f$ $f'$ will rotate as if keyed to the shaft $a$. This action is due to the fact that the sun-gears $f^2$ and $g$ have the same diameter, while the planet-gears $g'$ (although varying in number of teeth) have pitch-circles of the same diameter, so that the leverages afforded to the driving and to the reacting forces are equalized in the gears of the differential gear mechanism. Now suppose the eccentrics to be extended or projected outward and that it is desirable to draw them farther inward toward or to concentric or zero positions. This is accomplished by moving the lever $k^4$ and the gear-cage $g^4$ $g^5$ toward the left, or into the position indicated in Fig. 7ª, and then drawing one face $k'$ of the brake-ring $k$ against the friction-flange $g^{10}$ of the hub of the said cage. By this frictional engagement the rotary movement of the cage, which is in the same direction as that of the shaft $a$, is retarded or held back, and motion must then be transmitted through the differential planet-gears $g'$. With the gears positioned as indicated in Fig. 7ᵃ a movement of the shaft $a$, representing thirty-three teeth of the pinion $g$, will move the thirty-three and the thirty-two toothed planet-gears $g'$ one complete rotation; but the thirty-two-toothed gear $g$ which at this time engages the pinion $f^2$ of the pinion-toothed sleeve $f f'$ will move the said pinion $f^2$ but thirty-two teeth in advance, while the said pinion $g$ and shaft $a$ are given a movement represented by thirty-three teeth. Hence it is evident that under these conditions the eccentric-actuating pinion $f'$ of the sleeve $f$ is given a relative backward movement with respect to the movements of the shaft $a$ indicated by the arrows marked on Figs. 7, 7ᵃ, 4, 5, and 6. This retarded movement, which has the effect of a backward movement, will cause the pinion $f'$ to draw the eccentrics inward or toward concentricity. In Fig. 7ᵃ the eccentrics are shown as moved to their zero or inoperative positions, in which they are concentric with each other and with the axis of the shaft $a$. To extend the eccentrics or to throw them into eccentric positions, the lever $k^4$ and the shifting gear-cage $g^4 g^5$ are moved into the position indicated in Fig. 7, and the right-hand facing $k'$ of the brake-ring $k$ is by the lever $k^4$ pressed into frictional engagement with the facing $g^{11}$ of the flange-cage head $g^4$, and the rotary movement of the said cage is again retarded or held back, so that motion is transmitted through the differential planet-gears $g'$. In the position indicated in Fig. 7, however, it is the thirty-two-toothed pinions $g'$ that receive motion from the driving-pinions $g$ and the thirty-three-toothed pinions $g'$ which transmit the motion to the gear $f^2$ of the toothed sleeve $ff'$, so that under these conditions the eccentric-moving pinion $f'$ is given a relatively fast or advance movement with respect to the shaft $a$. This advance movement of course operates reversely from the retarded movement or relative backward movement of the pinion $f$ under the action previously described for drawing eccentrics inward, and hence in this case serves to extend the said eccentrics or to throw them outward from their zero or concentric positions. It has already been pointed out that the shipper-lever $k^4$ upon being released will under the action of its spring $k^9$ be automatically moved into positions which will render the brake-ring $k$ inoperative on the gear-cage $g^4 g^5$, so that the said cage will be left free to turn with the constantly-running driving-shaft $a$. It will also be remembered that when the rotary movement of the said gear-cage is not retarded the differential gear mechanism will serve to lock the eccentrics in whatever positions they may be set on the said shaft $a$.

By reference to Figs. 8 and 8ᵃ it will be seen that the stop $p'$ on the clutch-reversing rod $n$ is released from the end of the strap $k^3$ with which it coöperates only in the positions of the parts indicated in Fig. 8ᵃ.

The arrangement of the three eccentrics for radial movements on lines one hundred and twenty degrees apart maintains the balance of the eccentrics throughout all of their adjustments.

The invention above specifically described, and illustrated in the drawings, is of course capable of many modifications not herein mentioned within the scope of my invention.

What I claim, and desire to secure by Letters Patent of the United States, is as follows:

1. In a power-transmitting mechanism, the combination with a driving and a driven member, of one or more adjustable eccentrics carried by said driving member, a clutch receiving motion from said eccentrics and imparting the same to said driven member, a differential gear mechanism for adjusting said eccentrics, and means for controlling the said differential gear mechanism at will, substantially as described.

2. In a power-transmitting mechanism, the combination with a driving and a driven member, of one or more adjustable eccentrics carried by said driving member, a clutch receiving motion from said eccentrics and imparting the same to said driven member, and a differential gear mechanism for adjusting the said eccentrics, comprising a slidable rotary gear-cage, a pair of sun-gears, one of which is carried by the driving member and the other of which is loose thereon, differential planet-gears mounted on said gear-cage and interchangeably engageable with the said sun-gears, under the sliding movements of said cage, and a brake device for retarding the rotary movements of said gear-cage, to render the differential action of the gears effective to adjust the throw of said eccentrics, substantially as described.

3. In a power-transmitting device, the combination with one or more radially-adjustable eccentrics, a driver therefor and parts driven thereby, of a differential gear mechanism for adjusting the throw of said eccentrics, and means for rendering the said differential gear mechanism operative at will, substantially as described.

4. In a power-transmitting mechanism, the combination with one or more radially-adjustable eccentrics, a driver therefor and parts driven thereby, of a differential gear mechanism for adjusting said eccentrics, comprising sun and planet gears, a rotary slidable cage carrying the said planet-gears, and a brake or friction device for retarding the rotary movements of said cage, substantially as described.

5. With a power-transmitting mechanism, the combination with a driving shaft or member of one or more eccentrics driven thereby and radially adjustable thereon, said eccentrics having internal rack-teeth, and a differential gear mechanism for adjusting said eccentrics, comprising a pair of sun-gears, one secured to and the other loose on said driving-shaft, said loose gear having a sleeve with gear-teeth that mesh with the rack-teeth of the said eccentrics, a gear-cage mounted for sliding and rotary movements on said driving-shaft, a series of three rigidly-connected planet-gears mounted on said gear-cage and interchangeably engageable with said sun-gears, under the sliding movements of said cage, two of said planet-gears having the same number of teeth, and a third a different number of teeth, but all having the same pitch-circle, means for shifting said cage with the said planet-gears, and a brake device for retarding the rotary movements of said cage, substantially as described.

6. With a power-transmitting mechanism, the combination with a driving shaft or member, of one or more eccentrics driven thereby and radially adjustable thereon, said eccentrics having internal rack-teeth, and a differential gear mechanism for adjusting said eccentrics, comprising a pair of sun-gears one secured to and the other loose on said driving-shaft, said loose sun-gear having a sleeve with gear-teeth that mesh with the rack-teeth of said eccentrics, a gear-cage mounted for rotary and sliding movements on said driving-shaft, differential planet-gears, mounted on said cage, rigidly connected in a series of three and interchangeably engageable with the sun-gears, under the sliding movements of said gear-cage, a non-rotary brake-ring working between friction flanges or surfaces of said gear-cage, and a controller for shifting said brake-ring and gear-cage, said parts operating substantially as described.

7. In a power-transmitting mechanism, the combination with a driving shaft or member, of one or more eccentrics adjustably mounted thereon, devices actuated by said eccentrics, a differential gear mechanism for adjusting said eccentrics involving a rotary part which when retarded, actuates said differential gear mechanism to adjust said eccentrics, a brake movable in either of two directions to retard the movement of the said rotary actuating member, a lever with connections to said brake, and a spring applied to throw the said lever into an inoperative position to release said brake, when the said lever is raised, substantially as described.

8. The combination with a driving-shaft and a driven shaft, of a clutch on said driven shaft, three eccentrics mounted on said driving-shaft and radially adjustable on lines diverging at an angle of one hundred and twenty degrees, said eccentrics having internal rack-teeth, and a wide-faced pinion loosely mounted on said driving-shaft and meshing with the rack-teeth of the said three eccentrics, and a hand-controlled power device operating to vary the speed of rotation of said pinion with respect to that part of said driving-shaft, and thereby adjust the eccentrics, substantially as described.

9. In a power-transmitting device, the combination with a driving and driven member, and reciprocating parts for transmitting motion from the former to the latter, of a framework connecting the said driving and driven members, having a yielding intermediate section which cushions the pounding action of the reciprocating devices, substantially as described.

10. In a power-transmitting device, the combination with a driving and driven member, of eccentrics and a clutch device through which the former member drives the latter, a framework connecting said driving and driven members, having a yielding section located between the bearings for the said members, to cushion the pounding action of the said eccentrics, substantially as described.

11. The combination with driving and driven members of a reversible clutch on the driven member, eccentrics on the driving member, connections for operating the said clutch, a lever and lever-controlled mechanism for controlling the adjustments of said eccentrics, a rotary shaft and connections for reversing the action of said clutch, a stop on the said shaft, and a coöperative stop connected to and movable by said lever, which stops coöperate to permit the clutch to be reversed only when the said lever is in one extreme position, substantially as described.

In testimony whereof I affix my signature in presence of two witnesses.

WHITCOMB L. JUDSON.

Witnesses:
ORIN STANFORD,
HILMA JOHNSON.